March 5, 1968     J. C. LALANDE     3,371,634
APPARATUS FOR COMBUSTION CONTROL IN DIESEL ENGINES
Filed Oct. 19, 1966
FIG. 1
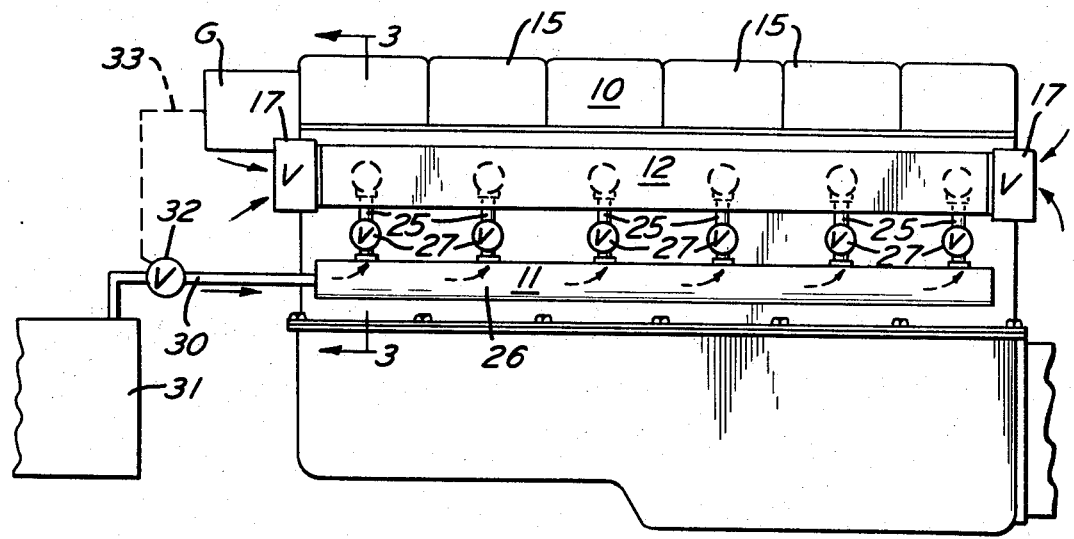
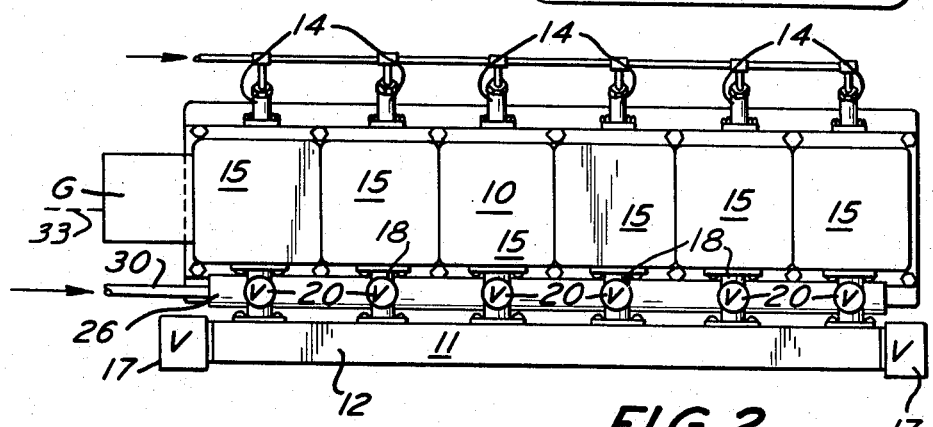
FIG. 2
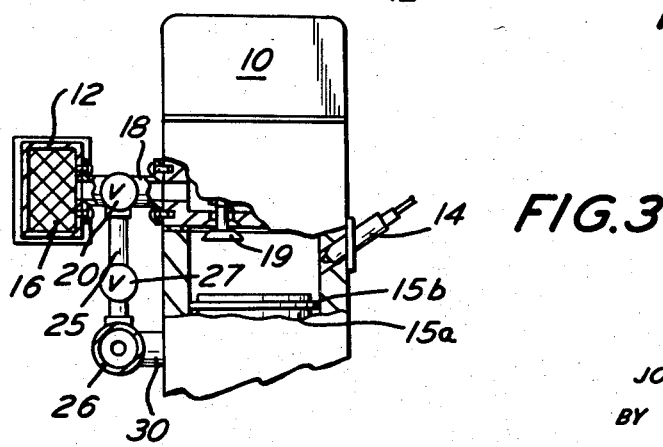
FIG. 3
INVENTOR
JOHN CLARK LALANDE
BY
*[signature]*
ATTORNEY United States Patent Office 3,371,634
Patented Mar. 5, 1968

3,371,634
APPARATUS FOR COMBUSTION CONTROL
IN DIESEL ENGINES
John Clark Lalande, 173 W. 8th St., Oswego, N.Y. 13126
Filed Oct. 19, 1966, Ser. No. 587,720
4 Claims. (Cl. 123—198)

ABSTRACT OF THE DISCLOSURE

Combustion control apparatus for diesel engines which includes individual shut-off valves in each air intake manifold connection to each cylinder and may include a source of combustion inhibiting fluid connected to each air intake manifold connection and controlled by normally closed shut-off valves.

---

This invention relates to a combustion control apparatus for diesel engines.

The operation of internal combustion engines known as the diesel type, is fraught with some degree of danger.

A diesel engine operates by spraying of fuel under pressure into the top of the combustion cylinder while the piston is at the top of its compression stroke. No external ignition is needed as the compression pressure supplies sufficient heat to generate combustion of the fuel. The conventional means of stopping a diesel engine is by cutting off the fuel supply.

Due to the high compression used in a diesel engine it can be operated on a variety of fuels. This results in economies of operation and consequently such engines are often used in enclosed areas where highly volatile fuels would present a fire hazard.

This use however has had problems not present with gasoline burning engines. The enclosed areas frequently contain a high concentration of oil fumes, and diesel engines have been known to run on the fumes alone.

The conventional method of cutting off the fuel supply will not, therefore, stop the engine when such fumes are present. Consequently, many cases have been recorded where diesel engines have run away with subsequent self-destruction and injury to attendant personnel. In some instances where the fuel supply and air supply have been cut off in an attempt to stop a runaway engine, intake gaskets or cylinder head gaskets failed and air enriched with oil was drawn in through these cracks, control of the engine was impossible and the engine ran away.

In other instances, the fumes enriched the air entering the manifold so that the engine governor was unable to control the engine speed thereby resulting in erratic and poor operation of the engine.

The present invention solves the problem by cutting off the supply of air to the cylinders individually or to all the cylinders and by supply of a combustion suppression fluid into the cylinders to retard or halt combustion and thereby control engine operational speed.

The principal object of the present invention is to provide a combustion control apparatus for diesel engines that is fast and positive in its operation.

A further object of the present invention is to provide a combustion control apparatus for diesel engines that can be readily attached to both new and existing diesel engines.

A further object of the present invention is to provide a combustion control apparatus for diesel engines that will function as a governor to lessen the amount of fuel vapor admitted to the intake manifold or individual cylinders.

A further object of the present invention is to provide a combustion control apparatus for diesel engines that will supply a combustion reducing fluid to the engine cylinders to prevent racing of the engine above high speed setting.

A further object of the present invention is to provide a combustion control apparatus for diesel engines that will automatically shut off an unattended engine when actuated by the engine speed governor.

A further object of the present invention is to provide a combustion control apparatus for diesel engines that is simple and inexpensive to construct but sturdy and reliable in operation.

Other objects and advantageous features of the invention will be apparent from the description and claims.

The nature and characteristic features of the invention will be more readily understood from the following description taken in connection with the accompanying drawings forming part thereof, in which:

FIG. 1 is a side elevational view of a portion of a typical diesel engine showing the combustion control apparatus attached thereto;

FIG. 2 is a top plan view of the engine and apparatus shown in FIG. 1, and;

FIG. 3 is a vertical sectional view taken on the line 3—3 of FIG. 1.

It should, of course, be understood that the description and drawings herein are illustrative merely, and that various modifications and changes can be made in the structure disclosed without departing from the spirit of the invention.

Like numerals refers to like parts throughout the several views.

Referring now more particularly to the drawings, a diesel engine 10 of conventional construction is shown having the combustion control 11 in accordance with the invention attached thereto.

The engine 10 is provided with an air intake manifold 12, individual cylinder fuel injectors 14, cylinders 15, intake valves 19 and other features (not shown) common to diesel engines.

The engine 10 is illustrated with six cylinders 15 of conventional type each cylinder 15 is provided with a piston 15a and piston rings 15b, one of which cylinders 15 is more fully illustrated in FIG. 3.

The air intake manifold 12 is of rectangular shape in cross section and is provided with an interior chamber 16. A pair of valves 17 are provided at each end of the manifold 12 to permit or to shut off air flow into the chamber 16 of the manifold 12.

Adjacent each cylinder 15 a flanged connection pipe 18 is provided bolted or otherwise fastened to the engine 10 and to the air intake manifold 12.

A valve 20 is provided in each pipe 18 between the manifold 12 and cylinder 15, the valves 20 are of conventional construction and can be regulated to permit full, limited, or no air flow from the manifold chamber 16 into each of the cylinders 15.

The pipes 18 are of T-shaped configuration with a vertical downwardly extending lower pipe 25 of cylindrical shape integral therewith with its upper end connected to the pipe 18 at approximately the center of the valve 20.

The lower pipe 25 is connected at its lower end to a hollow cylinder 26 and is provided with a valve 27 interposed in the pipe 25 between the pipe 18 and the cylinder 26.

The cylinder 26 has a pipe 30 attached thereto which extends to a source of combustion inhibiting fluid 31 which is under pressure. One suitable fluid is carbontetrachloride although many other non-combustion supporting fluids such as carbon dioxide are suitable.

A main valve 32 is provided interposed in the pipe 30 between the fluid source 31 and the cylinder 26 to control the access of fluid from source 31. A governor G is provided attached to the engine 10 and with a mechanical connection 33 to the main valve 32.

The mode of operation will now be pointed out.

The diesel engine 10 at rest is activated by rotating the flywheel and crankshaft (not shown) which rotates each of pistons 15a in cylinders 15. Assume the piston 15a as shown in FIG. 3 starts at top dead center and is moved downward. The intake valve 19 opens and air is drawn in through the manifold 12 and pipe 18. The piston 15a passes the bottom of its stroke and moves to the top compressing the air in the cylinder. When the piston 15a is almost at the top, fuel under pressure is injected into the cylinder 15 through the injector 14 in a well known manner, due to the temperature of the compressed air rapid combustion of the air-and-oil mixture occurs and the force of the explosion drives the piston down. If it is desired to shut off the engine, then the fuel supply would be shut off and no fuel injected into the cylinder 15 when the piston 15a has compressed the air. If however the air drawn into cylinder 15 contains fuel vapor in sufficient quantity so that ignition will take place and the engine will continue to operate, without fuel being supplied through the injector 14.

The valves 17 can be shut off whereby no air will flow into the interior of the chamber 16, the pipes 18 and the cylinder 15 halting further engine operation. If it is desired to reduce the engine speed however one or more of the valves 20 can be closed to shut off one or more cylinders 15. However, should the manifold or gaskets, pipes or other parts of the engine not be air tight and air enters the cylinder 15 shutting off the valves 17 or valve 20 will be of no avail.

In some cases when air has been effectively shut off at the manifold, oil and air have entered the cylinder from the oil breather pipe past the piston rings. Should this occur or should it be desired to further reduce combustion the valve 32 in pipe 30 can be opened, so that combustion inhibiting fluid from the source 31 will flow into one or more of the cylinders 15 through pipes 25 and 18 which fluid will halt further combustion in cylinders 15 to reduce speed or stop the engine as desired.

If desired and particularly for unattended engines the controls for the valves 17 (not shown) and or 20 and 32 can be connected to the governor G in such a manner by a mechanical connection so as to be activated when the engine speed passes a predetermined setting, thereby cutting off air flow and supplying combustion inhibiting fluid into the chambers 15 to reduce engine speed or completely stop the engine.

It will thus be seen that appropriate apparatus has been provided for effectively carrying out the objects of the invention.

I claim:
1. Combustion control apparatus for diesel engines comprising
   an air intake manifold for a diesel engine,
   a fluid connection from said manifold to each engine cylinder, and
   means for determining the air intake to said manifold for inhibiting combustion in said engine,
   said means including a normally open shut-off valve in each of said fluid connections.
2. Combustion control apparatus as defined in claim 1 in which
   said means includes an additional fluid connection connected to each of said first mentioned fluid connections, and
   a source of combustion inhibiting fluid connected to said additional fluid connections.
3. Combustion control apparatus as defined in claim 2 in which
   cut off valves are interposed between said additional fluid connection and each of said second mentioned fluid connections.
4. Combustion control apparatus as defined in claim 2 in which
   said combustion inhibiting fluid is carbontetrachloride.

References Cited
UNITED STATES PATENTS

| 305,467 | 9/1884 | Murray | 123—198 |
| 1,791,490 | 2/1931 | Dilworth | 123—52 |

FOREIGN PATENTS

| 544,657 | 4/1942 | Great Britain. |
| 888,949 | 2/1962 | Great Britain. |

WENDELL E. BURNS, *Primary Examiner.*